United States Patent
Desty et al.

[15] 3,635,032
[45] Jan. 18, 1972

[54] BOOM FOR OIL SPILT ON WATER

[72] Inventors: Denis Henry Desty, Weybridge; Leslie Bretherick, Ascot; Michael Guthrie Webb, Isle of Wight, all of England

[73] Assignee: The British Petroleum Company Limited, London, England

[22] Filed: Aug. 26, 1969

[21] Appl. No.: 853,116

[30] Foreign Application Priority Data

Sept. 13, 1968 Great Britain..................43,697/68

[52] U.S. Cl..................................................61/1 F
[51] Int. Cl..................................................E02b 15/04
[58] Field of Search..................................61/1 F; 210/242

[56] References Cited

UNITED STATES PATENTS

| 1,004,718 | 10/1911 | Wieland | 61/1 F |
| 3,219,190 | 11/1965 | Thume | 210/242 |
| 3,494,132 | 2/1970 | Logan | 61/1 F |
| 3,503,512 | 3/1970 | Desty et al. | 61/1 F |

Primary Examiner—Peter M. Caun
Attorney—Morgan, Finnegan, Durham & Pine

[57] ABSTRACT

A floatable oil spillage boom which comprises two arms so as to give a V-configuration The boom is deployed downwind of a slick which drifts into the apex so that it is concentrated to facilitate collection or destruction. Inflatable booms, e.g. air- and water-inflated are particularly suitable.

4 Claims, 7 Drawing Figures

INVENTORS
DENIS HENRY DESTY
LESLIE BRETHERICK
MICHAEL GUTHRIE WEBB

BY Morgan, Finnegan, Durham & Pine
ATTORNEYS

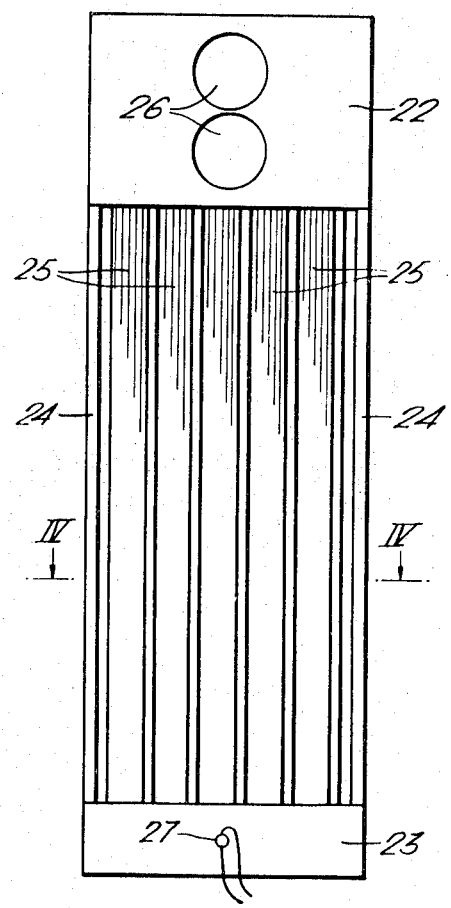
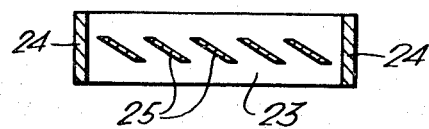

BOOM FOR OIL SPILT ON WATER

This invention relates to a boom for oil spilt on water.

Of recent years the quantity of oil moved around the world has continually increased and this has resulted in the use of ever larger tank ships. As a consequence the chances of oil spillage have increased and particularly of a very large oil spillage should one of the larger tank ships be wrecked.

It is an object of this invention to impede the spreading of such spillages.

According to the invention a boom for oil spilt on water comprises twin barriers, preferably inflatable, each having a free end and an apex end and each, during use, having a density such that each (when in use) floats with part below and part above the water surface so as to form a barrier which impedes the passage of floating oil, the two apex ends being joined together and the two free ends being capable of separation so that, when the boom is floating, it can adopt a V-configuration.

When a boom as described in the last paragraph is floating in the sea and an oil slick drifts into the mouth of the V it will, if it continues to drift towards the apex, become concentrated so that its collection or destruction is facilitated.

Preferably each free end of the boom is attached to a drogue adapted to create a high resistance to motion through the water so that it is easier for the wind to drive a slick into the apex. Asymmetric drogues are particularly suitable because they produce side forces to keep the mouth of the V open.

In this specification the term "inflatable barrier" means a barrier as described and claimed in the complete specification of U.S. Pat. application Ser. No. 738,559, filed June 28, 1968, and which is now abandoned (hereinafter called "the earlier specification"). A continuation application of said earlier abandoned application, being application Ser. No. 866,439, was filed on Oct. 14, 1969, and has now matured into U.S. Pat. No. 3,503,512.

The earlier specification describes and claims an inflatable barrier for oil spilt on water which comprises one or more air chambers and one or more water chambers all the walls of all said chambers being formed of flexible material, the chambers being so positioned that when suitably inflated with air and water the barrier will float with part below and part above the water surface so as to impede the passage of floating oil.

The earlier specification also describes and claims three embodiments within the above definition, these are Figure-of-Eight barriers, Beach Barriers and Skimming Barriers.

A Figure-of-Eight Barrier comprises twin hoses longitudinally joined together (i.e., the joint is longitudinal) and having a figure-of-eight cross section.

A Beach Barrier comprises a plurality of air hoses, e.g., five to 10, which are positioned side by side with at least one water hose attached to the air hoses, all the hoses being so positioned that when the barrier is inflated the air hoses form a raft and each water hose forms a ballast chamber so that the barrier floats with part below and part above the water surface so as to impede the passage of floating oil. (The water ballast also prevents the raft overturning). Preferably the air hoses are graded in diameter so that, when inflated, the raft has a wedge-shaped cross section.

A Skimming Barrier has one or more skimming chambers which run lengthwise along the barrier and which have perforations which connect at water level when the barrier is inflated and floating. It may also incorporate flexible flaps (made of material having a density intermediate between that of oil and water) which are fitted at the bottom of the perforations. Pumping out the contents of a skimming chamber causes them to be replaced by material from the surface of the water and this enables oil floating on the water to be recovered. The flaps find the oil/water interface and encourage preferential skimming of oil.

In this specification (and also in the earlier specification) the verb "to inflate" is used to designate the admittance of both air and water, as appropriate, and in both cases it implies the right quantity to confer the desired mechanical properties on the inflated barrier. (During inflation of a barrier a little water may be introduced into an air chamber or a little air into a water chamber. This "contamination" must be maintained at a sufficiently low level to avoid undesirable reduction in the efficacy of the barrier. If necessary this contamination could be reduced by incorporating suitable interconnections with nonreturn valves between the air and water chambers).

The invention will now be described by way of example with reference to the accompanying drawings in which:

FIG. 3 is a front view of a second type of drogue,

FIG. 4 is a cross section of the drogue shown in FIG. 3, and

Figure 1:
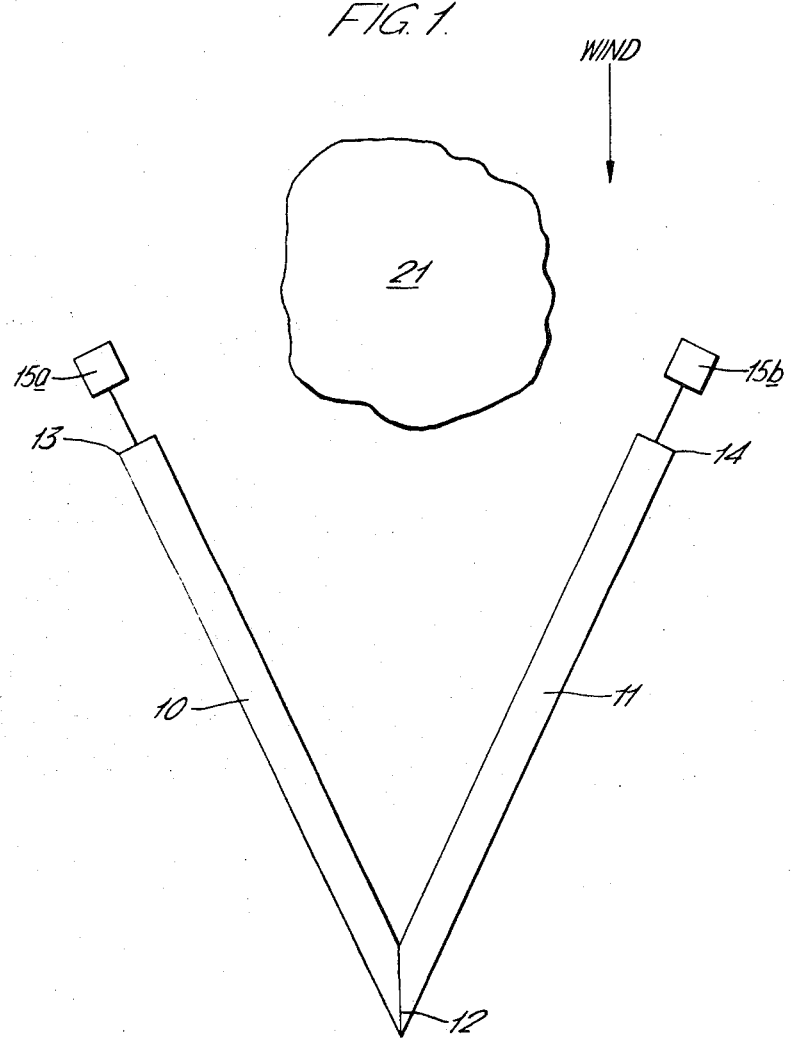
FIG. 1 is a plan view of a boom according to the invention while in use.

The boom shown in FIG. 1 comprises two barriers 10 and 11 which float part in and part out of the sea so as to impede the passage of floating oil. The two barriers are joined at the apex 12 to give a V-configuration. At their free ends 13 and 14, the barriers 10 and 11 are attached to drogues 15a and 15b and these resist the tendency of the boom to drift downwind and they also separate the free ends 13 and 14 to stabilize a V-configuration.

In use, and as shown in FIG. 1, the boom is deployed downwind of an oil slick 21 which will drift with the wind. Since the drifting of the boom is slowed by the drogues the slick will enter the V and accumulate at the apex 12. Various forms of drogues are suitable for use and two forms are shown, one in FIG. 2 and the other in FIGS. 3 and 4.

Figure 2:
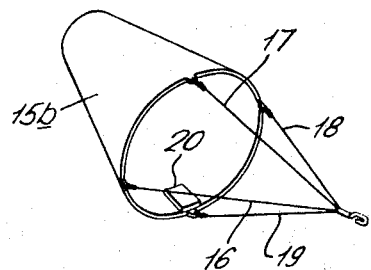
FIG. 2 is a perspective view of a first type of drogue.

The drogue shown in FIG. 2 takes the form of a tapered sleeve which is attached to its barrier by means of a four-line bridle 16, 17, 18 and 19. The line 16 is longer than the line 18 while the lines 17 and 19 are equal in length. The drogue has a ballast weight 20 which ensures the line 18 is on the outside and hence the axis of the drogue is outwardly inclined relative to the axis of the barrier 10 so as to produce a side force. The other drogue 15a is "mirror image" of the one shown so that the side forces keep the V open.

The drogue shown in FIGS. 3 and 4 comprises a float 22 which is attached to a ballast weight 23 by means of bars 24. Slats 25 are supported between the float 22 and the ballast 23 and these create a high resistance when towed through the water. As can be seen from FIG. 4 the slats 25 are inclined so as to produce side forces which keep the V open.

(The barrier is attached directly to the float 22, the point of attachment being indicated by the numeral 26. In addition the ballast 23 has a line 27 which can be attached to the bottom of the barrier so as to prevent the drag tending to lift the ballast 23).

Figure 5:
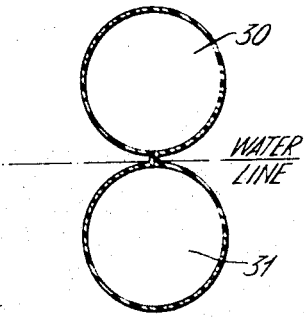
FIGS. 5-7 are cross sections of barriers (as shown in the drawings accompanying the earlier specification) suitable for use in the V-booms shown in FIG. 1.
Figure 6:
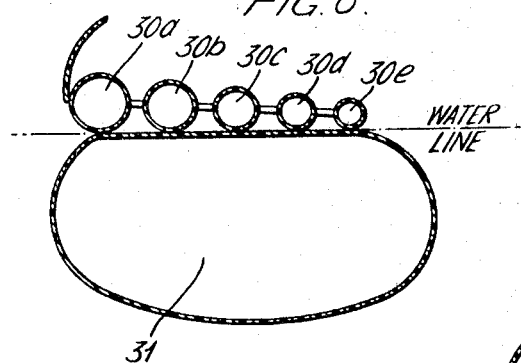
Figure 7:
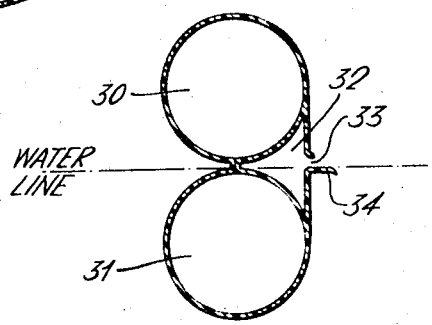

FIG. 5 shows an inflatable figure-of-eight cross section which is suitable for the barriers 10 and 11. In use there is an upper air hose 30 and a lower water hose 31. FIG. 6 is similar but with 5 air hoses 30a, 30b, 30c, 30d and 30e and a single water hose 31. FIG. 7 is also similar to FIG. 5 but with the addition of a skimming chamber 32 which has perforations 33 at the water line. The pressure in the hoses 30 and 31 holds the skimming chamber 32 open so that an oil slick can be recovered via the perforations 33 by pumping out the contents of the chamber 32. A flexible flap 34 (of polythene or material of similar density and properties) is attached below the perforation 33.

We claim:

1. A boom for collecting oil spilt on water, which boom comprises two barriers for impeding the passage of the spilt oil, and two drogues associated with the respective barriers for holding said barriers relatively stationary but not anchored relative to the water against a wind driving the spilt oil floating on the water, each drogue being so constructed as to create, during use, a high resistance to motion through the water, each barrier having a free end and an apex end and being attached at its free end to its associated drogue, and each barrier also having a density such that, during use, each barrier floats with part below and part above the water surface so as to impede the passage of the spilt floating oil, the two apex ends being joined together and the two free ends being capable of separation so that, when the boom is floating, said barriers can adopt a V-configuration, whereby the spilt oil floating on the surface of the water and driven by the wind more quickly than is the boom will enter the mouth of the V and accumulate at the apex.

2. A boom according to claim 1, in which each drogue is asymmetric so as to produce side forces which separate the free ends of the barriers to keep the mouth of the V open.

3. A boom for collecting oil spilt on water, which boom comprises two barriers for impeding the passage of the spilt oil, and two drogues, one for each barrier, for holding said barriers relatively stationary but not anchored relative to the water against a wind driving the spilt oil floating on the water, each drogue being so constructed as to create, during use, a high resistance to motion through the water, each barrier having a free end and an apex end and being attached at its free end to its associated drogue, and each barrier comprising at least one inflatable air chamber and at least one inflatable water chamber and the walls of all said chambers being formed of flexible material, each said air chamber being inflated with air and each said water chamber being inflated with water, the chambers being so constructed and arranged that each said water-inflated chamber will serve as main ballast for its barrier, and each barrier will float with part below and part above the water surface so as to impede the passage of the spilt floating oil, the two apex ends being joined together and the two free ends being capable of separation, and each drogue being asymmetric so as to produce, during use, side forces which separate the free ends of the barriers and thereby produce a V-configuration, whereby oil floating on the surface of the water and driven by the wind more quickly than is the boom will enter the mouth of the V and accumulate at the apex.

4. A boom according to claim 3 in which each barrier is a figure-of-eight barrier.

* * * * *